United States Patent
Shoaff, III

[11] Patent Number: 5,921,830
[45] Date of Patent: Jul. 13, 1999

[54] AVIATION AUTO-INFLATABLE LIFE RAFT

[76] Inventor: Frederick B. Shoaff, III, 452 Wall's Way, Osprey, Fla. 34229

[21] Appl. No.: 09/003,730

[22] Filed: Jan. 7, 1998

Related U.S. Application Data

[62] Division of application No. 08/890,279, Jul. 9, 1997, Pat. No. 5,800,225, which is a continuation of application No. 08/535,900, Sep. 28, 1995, abandoned.

[51] Int. Cl.⁶ .................................................. B63B 35/58
[52] U.S. Cl. .............................. 441/37; 441/38; 441/39; 441/40
[58] Field of Search ................. 441/35, 36, 37, 441/38, 39, 40, 41, 42, 43, 80; 114/345

[56] References Cited

U.S. PATENT DOCUMENTS

| | | | |
|---|---|---|---|
| 2,784,425 | 3/1957 | Bicknell et al. | 114/311 |
| 2,908,919 | 10/1959 | Bicknell et al. | 441/38 |
| 3,034,154 | 5/1962 | Silverstone | 441/40 |
| 3,037,218 | 6/1962 | Brooks, III | 441/38 |
| 4,533,333 | 8/1985 | Andrew et al. | 441/38 |
| 4,692,124 | 9/1987 | Harper | 441/40 |

Primary Examiner—Stephen Avila
Attorney, Agent, or Firm—Baker & Daniels

[57] ABSTRACT

The present invention involves an inflatable life raft for use in an aircraft. The life raft comprises an air providing device, a floor, a buoyancy tube, and a canopy. The buoyancy tube is disposed about the floor. The canopy protects survivors located on the floor, and includes a cover and an inflatable support having at least three inflatable legs attached to the buoyancy tube. The air providing device inflates the buoyancy tube and the inflatable support. The canopy cover may be positioned in at least three arrangements: a closed position, a sailing position, and a convertible position. The two layered canopy cover includes two zippered doors allowing for ingress and egress, and has a plurality of radar reflective portions. The floor has a generally round shape or a polygonal shape with at least ten sides. A second buoyancy tube is disposed on the first buoyancy tube, and both have approximately the same size. The floor comprises an insulated double floor, and is attached to a plurality of ballast bags disposed around to the outer under perimeter of the floor for stabilizing the life raft in water. A sea anchor is coupled to the lower buoyancy tube by an adjustable swiveled line. A grab handle is attached to the buoyancy tube. The floor comprises an upper floor, a lower floor, and a plurality of reeds defining a buoyancy chamber. A righting line with hand grips is mounted on the underside of the floor so that when the life raft is inflated upside down in the water, a survivor may grasp the righting line and right the life raft.

32 Claims, 6 Drawing Sheets

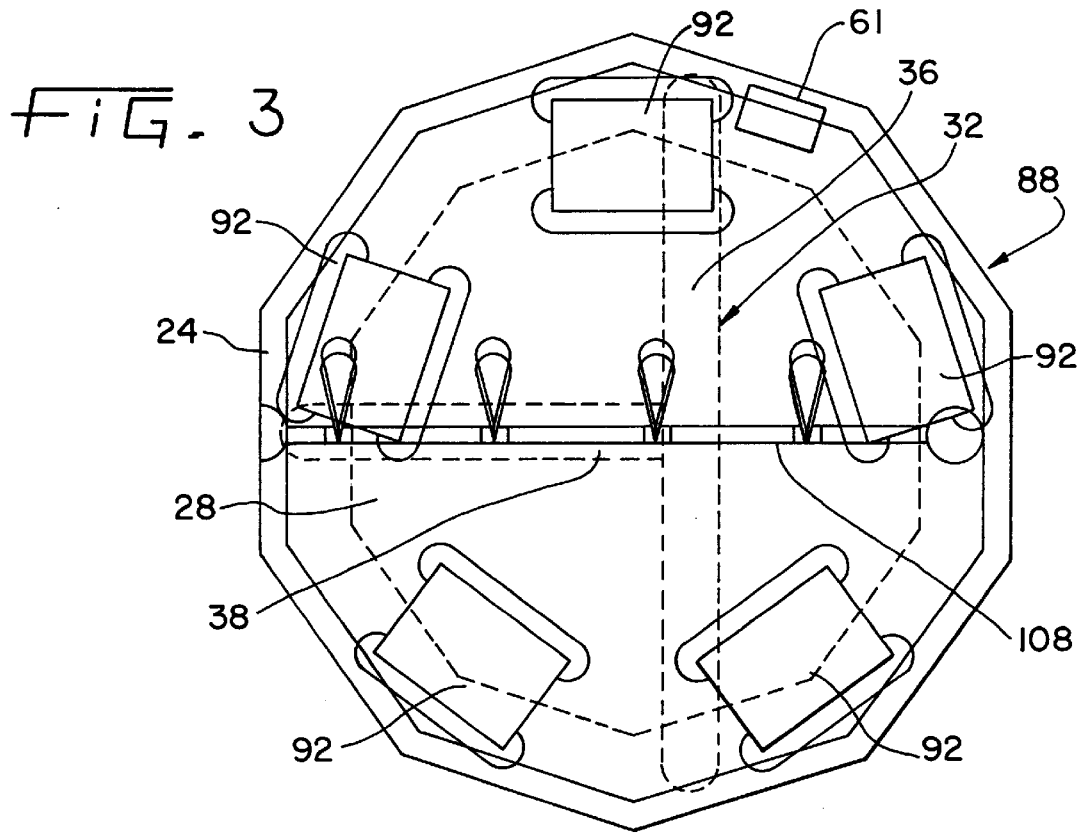
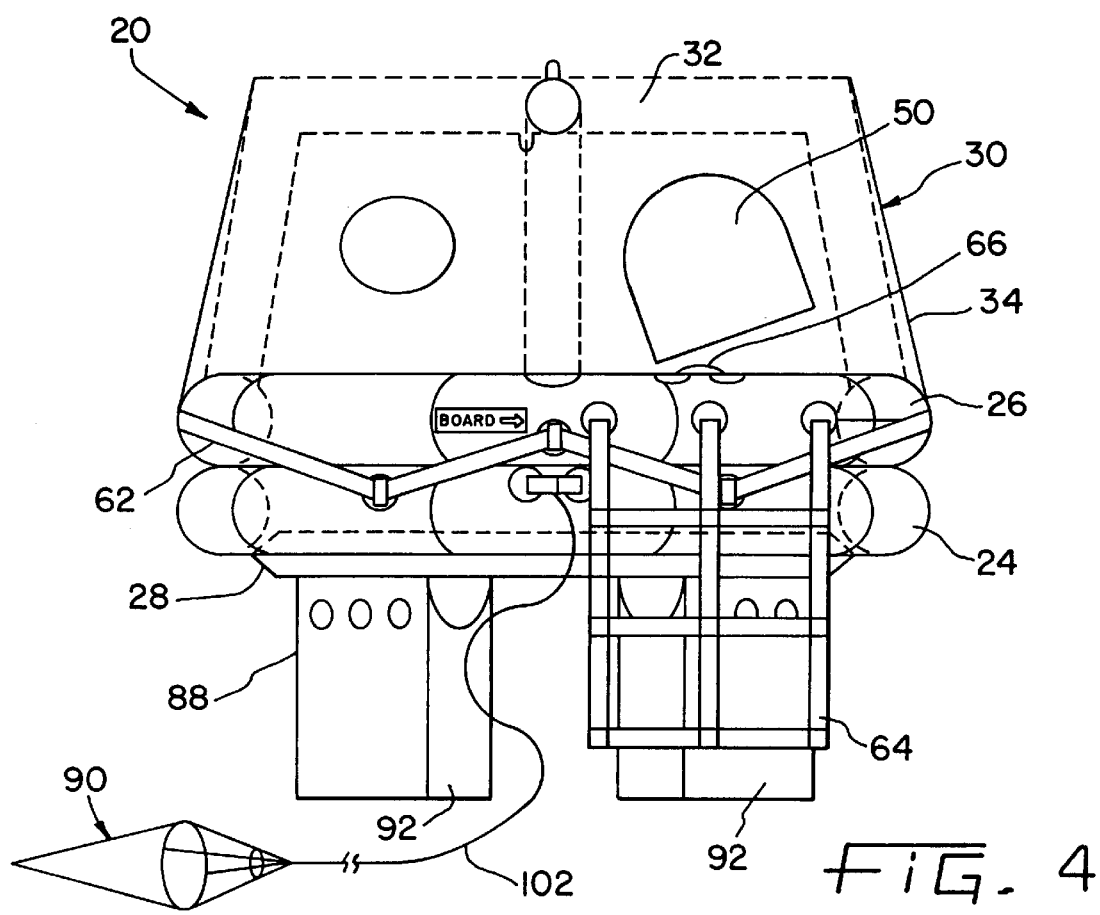

AVIATION AUTO-INFLATABLE LIFE RAFT

This is a division of application Ser. No. 08/890,279, filed Jul. 9, 1997, now U.S. Pat. No. 5,800,225 issued Sep. 1, 1998, which is a continuation of application Ser. No. 08/535,900, filed Sep. 28, 1995 now abandoned.

BACKGROUND OF THE INVENTION

1. Field of the Invention

The invention generally relates to emergency life rafts. More particularly, the field of the invention involves emergency life rafts used in aircraft for emergency landings in water.

2. Description of the Related Art

Aircraft which fly over oceans or other large bodies of water require life rafts in case of a premature landing of the aircraft in the water. These life rafts are similar to life rafts used with marine craft except that the aviation life rafts must be much lighter in weight to be transported by the aircraft, and must inflate more rapidly because generally aircraft sink in the ocean faster than sinking marine vessels. Typically, an aviation life raft weighs approximately 50 pounds and is stored in a valise capable of being stored in compartments of the aircraft. Once deployed, however, the aviation life raft must rapidly inflate (30 seconds) and protect survivors from hostile environments. The life raft must keep the crash survivors afloat, and also guard the crash survivors against hypothermia which can be fatal within minutes.

Aviation life rafts must fulfill several areas of concern to the crash survivor: the life raft must be easy to deploy and operate, entry must be easily accomplished, the survivors must be protected from the sea and the elements, the life raft must function adequately, and the life raft must provide an area for the survivors to rest with some level of comfort. An aviation life raft must be designed with these concerns in mind, and must comply with the physical constraints of the amount and size allowed on an aircraft.

An aviation life raft is typically inflated by a "rip cord" action similar to the opening of a parachute. Lifelines and boarding ladders are attached to the life raft so that people in the water may pull themselves into the life raft or hold onto same until all survivors have boarded the life raft. To protect the crash survivors and provide the most comfort, a double tube design provides both redundancy in the floatation device and a higher back upon which the survivor may sit against. The survivors must be further protected by a canopy, typically supported by assemble-able rods, which is most desirable in the form of a self-erecting canopy. The self-erecting canopy has a support structure which supports the canopy extending over the life raft. To guard against hypothermia of the survivors, a double floor may be employed to insulate the crash survivors from cold water.

However, the prior aviation life rafts present many difficulties for survivors of downed aircraft in that the structures are not quickly and easily assembled in the hostile conditions often found in ocean, gulf and large lake waters. For example, the inflation of the boat must be arranged, and the canopy must be separately assembled. Also, the survivors must be provided with mechanisms to aid their entry into the life raft. Further, the structure of the life raft should accommodate the survivors for several days or more until a rescue party locates the life raft. What is needed in the art is an aviation life raft which improves upon these various constraints of prior aviation life rafts.

SUMMARY OF THE INVENTION

The present invention is a self-inflating aviation life raft which has three inflatable legs attached to the buoyancy tube which supports the canopy cover. Also, the life raft includes a ballasting system for stabilizing the life raft in the water, the ballast including a plurality of ballast bags disposed around the outer perimeter of the life raft floor. The cover further includes a plurality of radar reflective portions for making the life raft more apparent to rescuers normally using radar detection. The life raft is inflatable through the action of a single activation device to facilitate its deployment in the event of an aircraft "ditching."

The life raft includes an auto inflatable self erecting canopy using a $CO^2$\nitrogen canister. This provides immediate protection for the crash survivors upon entry into the life raft, protecting against extreme cold, intense heat, severe stormy weather, or bright penetrating sun. The three leg or tripod arched canopy support provides strong bracing resistance against heavy winds and breaking seas, as well as provide integral strength to the life raft structure. The canopy support extends high over the floor so that the survivors have extensive headroom and shoulder room, which also combats the development of claustrophobia by the survivors often experienced by survivors in conventional life rafts. This support structure also provides an extra wide boarding area, comprising of almost half the circumference of the life raft, greatly improving the survivor's ability to board the life raft.

The canopy cover includes many advantageous features. The zippered entry doors prevent the canopy from blowing open or blowing off during high wind velocity conditions. Having the cover affixed to the buoyancy tubes of the life raft prevents breaking waves from penetrating the interior of the life raft, particularly important with colder temperatures. The double layered canopy cover provides superior insulation against cold temperatures and deters canopy cover fabric destruction. The molten orange color of the exterior of the canopy cover provides high visibility for rescue craft. The powder blue interior color eases and soothes the light refraction of the survivors eyes caused by the sun's reflection on the water, and also tends to reduce the survivors' sense of anxiety and sea sickness.

The canopy cover may be deployed in closed, sail, or convertible positions. The closed position provides survivors protection in foul/stormy weather as well as from cold temperatures. The sail position provides an openness for the survivors, visibility for searching out and signaling rescue craft, and enable the life raft to sail the trade winds towards shore. The convertible position provides an openness for the survivors, visibility for searching out and signaling rescue craft, and provides easier access and egress for final rescue.

The floor and the buoyancy tubes are round in shape, which is implemented by a polygon of ten or more sides. This rounded shape enhances the life raft's resistance to capsizing or pitch poling in heavy seas, or from rolling over longitudinally in a wave tough. The floor is an insulated double floor with a reed system. The insulation of the double floor protects the survivors from hypothermia which may ensue in waters having a temperature of less than 84° F. The double floor also provides an additional floatation chamber to enhance the buoyancy of the life raft, enabling the life raft to float higher in the water in all conditions especially where another buoyancy chamber has been punctured.

The buoyancy tubes are oversized with duplicate double chambers. The double tubes increase the "freeboard" height to improve the safety and comfort of the survivors. The additional height due to the second tube reduces the possibility of a survivor being ejected out of the life raft from turbulent sea conditions. Also, the higher life raft sides reduces the likelihood of water entering the life raft in choppy seas. A second tube provides redundancy so that a puncture of one tube does not cause the life raft to sink.

Boarding the life raft of the present invention is easier because of the heavy duty boarding assist grab handles and the retractable webbing of the "inside the raft" boarding ladder. The assist grab handles are made from two inch wide webbing to facilitate the survivor's grip and reduce hand/skin chaffing, particularly in cold temperatures. The ladder is made from similar webbing, and includes "quick release" fittings that may be stowed away after all survivors have boarded. The ladder may also be reconnected inside the life raft to provide extra support for the survivors to hold on to in turbulent seas. Such heavy duty webbing is also located on the bottom of the life raft with "hand" holds to provide quick and immediate righting with minimal effort when the life raft inflates upside down.

The inventional life raft includes deep water ballast compartments disposed around its periphery to provide superior stability in all water conditions, from moderate chop to heavy seas. The ballast bags surround the outer perimeter bottom of the life raft giving support and stability regardless of the number of survivors. The wide and deep ballast bags allow for a single survivor to board the life raft without capsizing it. A hemispherical fully swiveled sea anchor with a tether line aids the ballast. The sea anchor is a self deploying unit which automatically releases as soon as the life raft inflates. The sea anchor aids boarding by helping to guide the life raft in one direction. The sea anchor also helps hold the leading edge of the life raft steady in the water, allowing waves to break over the covered top of the life raft, and prevents the life raft from spinning at all times.

The inflation system aids the deployment of the life raft. The single aluminum inflation cylinder with a aluminum cylinder and Mirada aluminum firing head greatly reduces weight. With only one inflation cylinder and one "pull cord", the possibility of inflation failure due to static line entanglement is reduced. Also, weight is very measurably reduced over the normal two stack cylinder found in conventional life rafts. The single action/snap tight topping off valves allow for quick action when topping up the buoyancy tubes and floor. The adapter snaps quickly into place without requiring any threaded engagement found in conventional life rafts.

The interior portions of the life raft also have advantageous features. Five survival storage pockets provide dry storage compartments for use by the survivors after obtaining the standard survival equipment which is secured on the tubes of the life raft. The floor of a life raft is normally wet. Because of the light weight of the rest of the life raft, the aviation life raft of the present invention allows for a greater amount of storage equipment, far exceeding the minimal requirements. The entire self-inflating life raft is stored in a urethane coated aluminized valise which is virtually indestructible, and protects the life raft from damage while it is stored in the aircraft prior to deployment, or when it is being moved out of the aircraft.

The present invention, in one form, is an inflatable life raft for use in an aircraft. The life raft comprises an air providing device, floor, a buoyancy tube, and a canopy. The buoyancy tube is disposed about the floor. The canopy protects survivors located on the floor, and includes a cover and an inflatable support having at least three inflatable legs attached to the buoyancy tube. The inflatable support is coupled with the air providing device whereby the air providing device is adapted to inflate the buoyancy tube and the inflatable canopy support.

In another form, the present invention includes ballast for stabilizing the life raft when said life raft is inflated and disposed in water, the ballast being disposed around the outer perimeter of the underside bottom of the floor.

In yet another form, the present invention includes a plurality of radar reflective portions disposed on the canopy cover and canopy supports.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 3 is a bottom view of the life raft of FIG. 1.

FIG. 4 is a rear view of the life raft of FIG. 1 with the sea anchor deployed.

Figure 1:
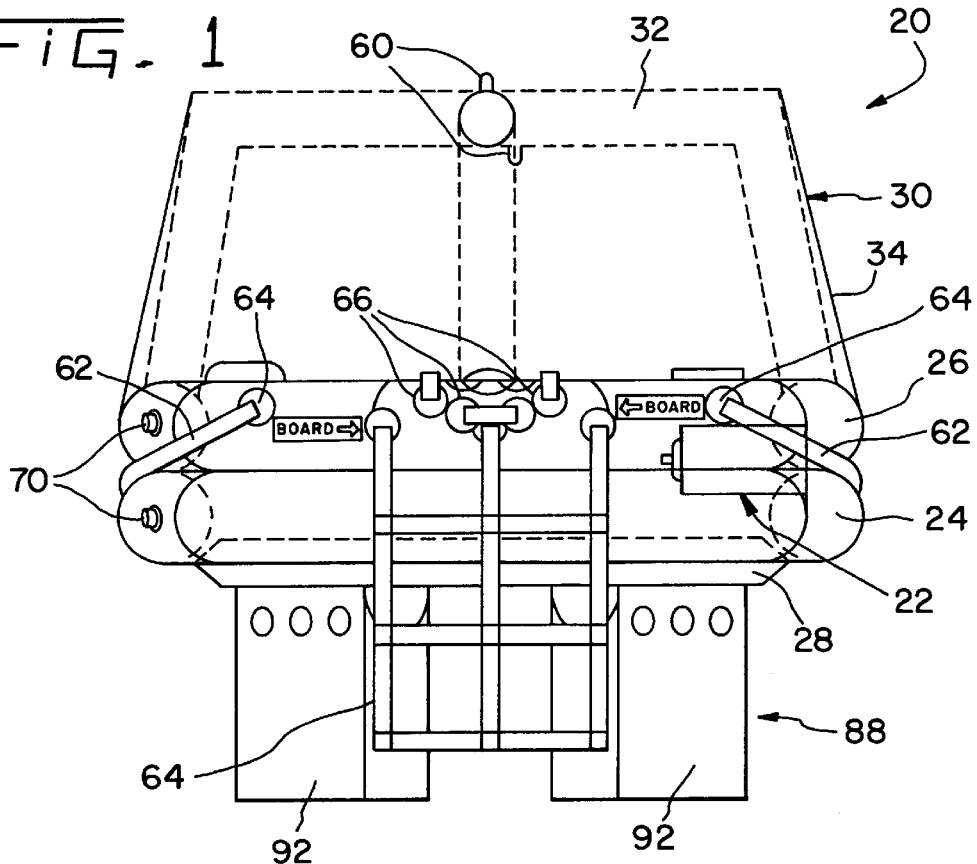
FIG. 1 is a head-on front view of the life raft of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The overall configuration of the inflatable life raft of the present invention is shown in FIGS. 1–4. Life raft 20 includes inflation system 22 for filling the inflatable portions of raft 20. The inflatable portions of raft 20 include buoyancy tubes 24 and 26, floor 28, and canopy 30. These inflatable elements are coupled via a series of valves (not shown) which allow for the single inflation system 22 to fill all the elements with air while keeping each chamber sealed. For purposes of this application, the term "air" refers to gaseous material, such as a mixture of $CO_2$ and $N_2$, which provides the necessary buoyancy of raft 20.

In accordance with an aspect of the present invention, canopy 30 comprises tripod support 32 and cover 34 as shown in FIGS. 1–6. Tripod support 32 includes U-shaped tube 36 mounted on buoyancy tube 26, spanning circumference A (see FIG. 2), which is additionally supported above tube 26 and floor 28 by leg 38. In this exemplary embodiment, U-shaped tube 36 extends at least 42–45 inches, accordingly to life raft size, above floor 28. Having U-shaped tube 36 supported by leg 38 increases the stability of canopy 30 and holds cover 34 above floor 28. In this exemplary embodiment, U-shape tube 38 is generally squared-off to provide sufficient head room for survivors.

Figure 5:
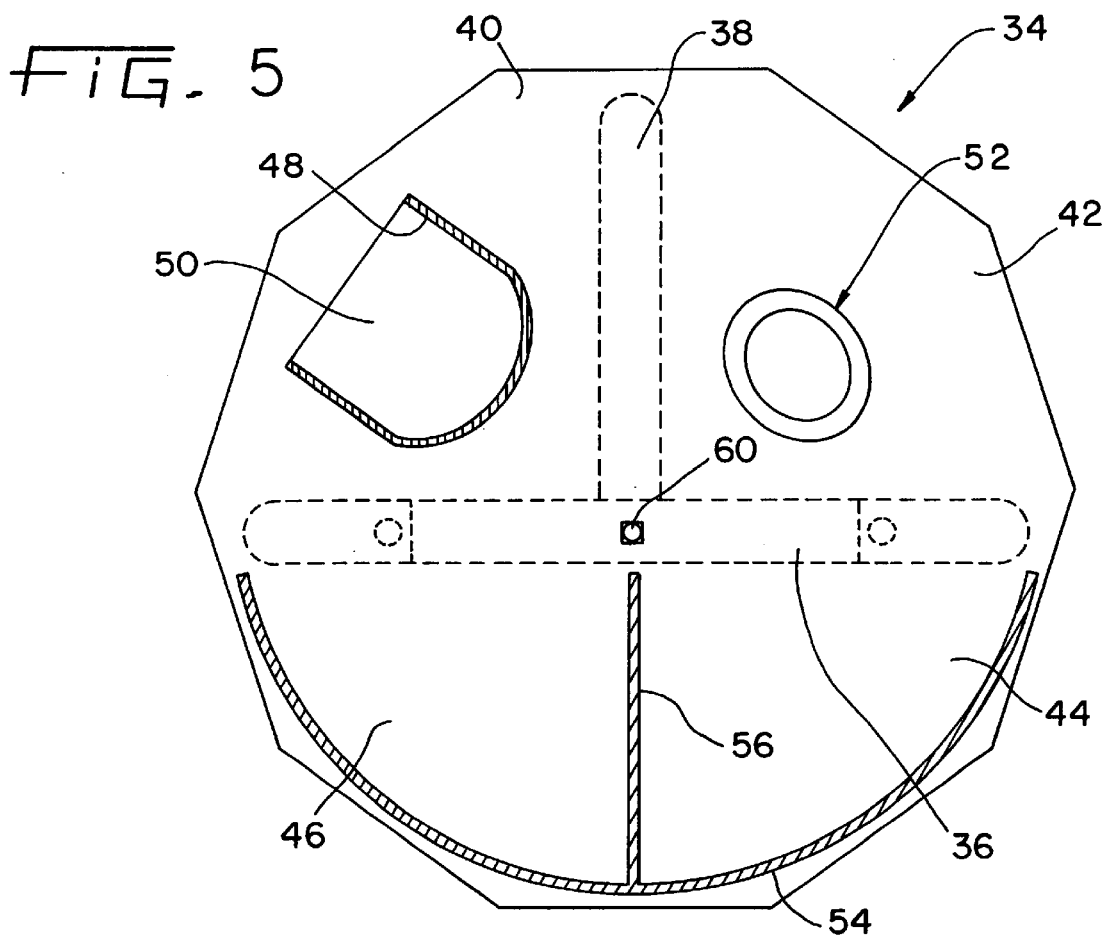
FIG. 5 is a top plan (looking down) view of the canopy cover of the present invention.
Figure 11:
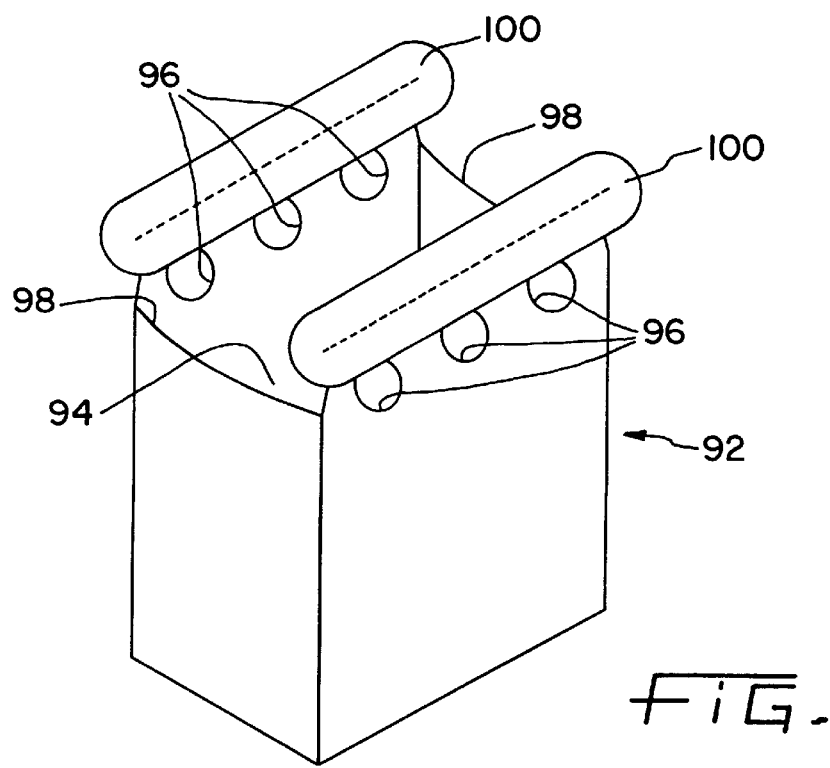
FIG. 11 is a perspective view of a ballast bag of the present invention.
Figure 6:
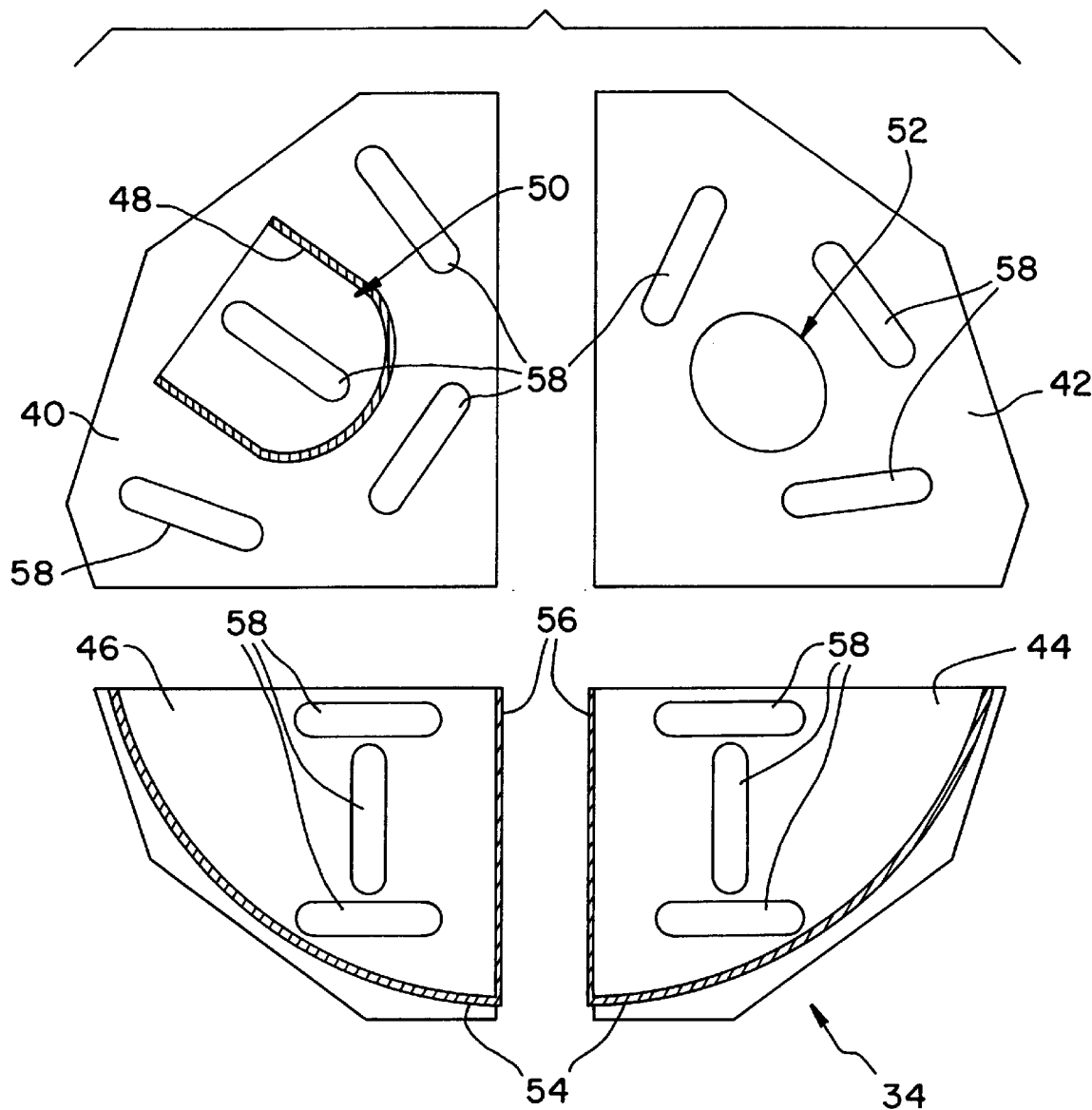
FIG. 6 is an exploded (looking down) view of the canopy cover of FIG. 5.

Canopy cover 34 is attached to buoyancy tube 26 by rubber adhesive, stitching, heat bonding, or other suitable combination of affixing devices. FIGS. 5 and 6 show views (assembled and unassembled) of cover 34 which is comprised of sections 40, 42, 44, and 46, each of which utilize a double layer construction. Additionally, the zippers of cover 34 are reversed to deter penetration of water into the interior of the life raft 20. Sections 40 and 42 are disposed over tripod support 32, with section 40 including zippered doorway 48 which allows ingress and egress when door panel 50 is unzipped. Zippered doorway 48 is rounded to deter penetration of water. Section 42 includes porthole 52 which provides a visual window and rain catcher to the exterior of life raft 20. Sections 44 and 46 are disposed opposite tripod support 32, and include bottom zipper 54 and center zipper 56.

Zippers 54 and 56 allow canopy cover 34 to be disposed in a closed position, wherein sections 44 and 46 are zippered shut; a sail position, wherein sections 44 and 46 are both open so that sections 40 and 42 act as a sail; and a convertible position, wherein only one of sections 44 and 46 is open. The closed position provides protection against foul and stormy weather and insulates the interior from cold air temperatures by virtue of the double layer construction. The sail position allows greater visibility for searching and signalling rescue craft, and enables life raft 20 to sail trade winds towards shore. The convertible position both protects the survivors on three sides while allowing visibility for searching and signalling rescuers and access for egress from life raft 30.

In accordance with another aspect of the present invention, cover 34 includes a plurality, 12 in this exemplary embodiment, of unidirectional radar reflective sections or portions 58. Radar reflective portions 58 may give a decisive edge to life raft 20 in aiding search and rescue operations. The arrangement of radar reflective portions 58 catches all angles so that life raft 20 is always observable. Radar reflective portions are also disposed on tripod support 32 for when cover 34 is not used. Portions 58 reflect not only search lights but also radar that can be observed by the radar equipment of search and rescue craft from many miles away. An additional beacon is provided by lights 60 disposed on the upper and lower sides of canopy cover 34. Lights 60 are coupled to water-activated batteries 61 (FIG. 3) disposed in a lower portion of life raft 20. Radar reflective portions 58 and lights 60 are disposed at or near the top of canopy 30, well above the top of buoyancy tube 24 which is structured and arranged to extend well above the water surface when life raft 20 is fully inflated.

Buoyancy tubes 24 and 26, in the exemplary embodiment, form a ten sided polygon of sufficient diameter to approximate a round exterior. Tubes 24 and 26 provide an interior wall defining the space in which survivors may be located. In the exemplary embodiment, tubes 24 and 26 have approximately the same diameters thereby increasing the freeboard height. The exterior of tubes 24 and 26 also have several features which may aid survivors in the water grab onto life raft 20 and enter inside. Lifelines 62 extend across tubes 24 and 26, being affixed to the exterior of the tubes similarly to the affixation of canopy cover 34 to tube 24 via a series of patches. Lifelines 62 may be used by survivors to initially grab onto life raft 20. Webbed ladders 64 are positioned vertically disposed adjacent door panel 50 and canopy sections 44 and 46 so that survivors may climb up into life raft 20. The three webbing portions add stability to ladders 64 which facilitate the entry of survivors. Ladders 64 may initially be deployed on the exterior, but are capable of being placed within canopy 30 so that survivors within life raft 20 may hold onto ladder 64 for support. In the exemplary embodiment, webbed ladders 64 are made of thick webbing, e.g., two inch wide nylon webbing, to increase survivors' grip and reduce hand/skin chaffing (particularly in cold temperatures). Webbing ladders 64 may be detached from the exterior of tubes 24 and 26 and attached to the interior to provide internal gripping areas for survivors riding inside lift raft 20. Mounted on buoyancy tube 26 above webbing ladders 64 are boarding grips 66 which allow survivors to grab onto for the final pull into life raft 20. In the exemplary embodiment, boarding grips 66 are also made of the thick webbing of webbed ladders 64. For sending out a line to a survivor swimming a distance from life raft 20, heaving line 68 is disposed exteriorly on tube 26. Also, if over-pressure deflation of either of tubes 24 or 26 becomes desirable, because of expansion induced by higher temperatures, each includes an exteriorly mounted pressure relief valve 70, as well as an interiorly mounted inflate/deflate valve 72. Above floor 28, tube 24 and/or tube 26 has lifeline 74 attached similarly to exterior lifelines 62.

Figure 9:
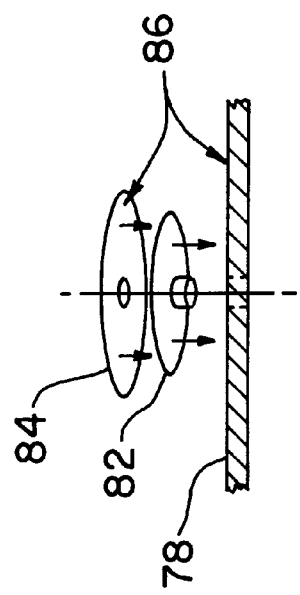
FIG. 9 is an exploded view of a floor patch of the present invention.
Figure 8:
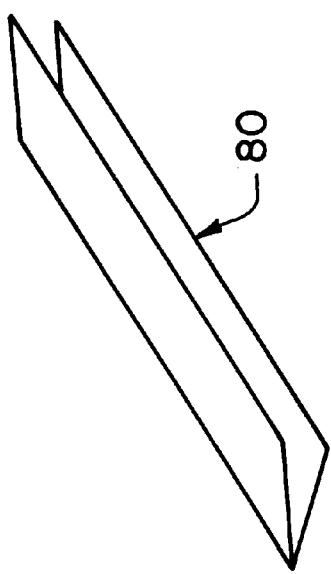
FIG. 8 is a perspective view of the hinging tape of the present invention.
Figure 7:
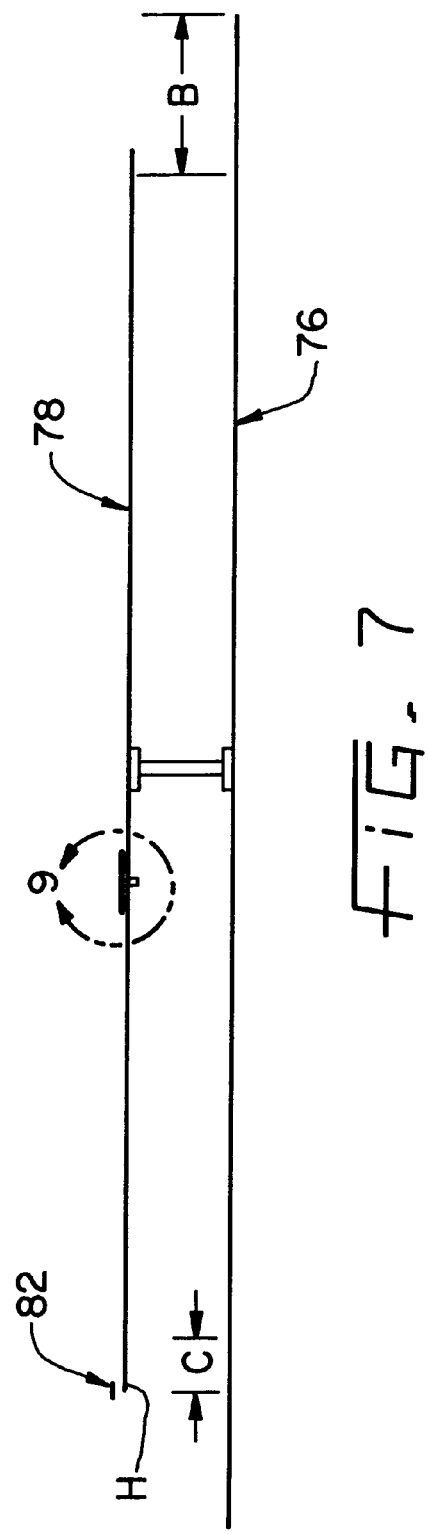
FIG. 7 is a sectional (from the side) view of the floor of the life raft.

Floor 28 is attached to the outer perimeter of lower buoyancy tube 24. FIGS. 7–9 show details of inflatable double floor 28 which protects survivors from hypothermia as well as providing additional buoyancy for life raft 20. Lower floor 76 has a bonding portion B (FIG. 7) which extends for a length, e.g., twelve inches in the exemplary embodiment, with the bottom of buoyancy tube 24 to form a seal. Upper floor 78 is also attached to lower floor 76 through a hinged arrangement at edges H with tape hinge 80 (FIG. 8) so that tape hinge 80 can provide a flexible attachment. Additional tape 82 is applied over the portion of upper floor 78 which is attached directly to lower floor 76. Reed 80 is disposed between upper floor 78 and lower floor 76.

Floor 28 is constructed by cutting the pieces forming upper floor 78 and lower floor 76. Next, lower floor 76 is centered over upper floor 78 and marked. Then, reed 80 is cemented or otherwise affixed, such as by sealing of dielectric welding, to the center of lower floor 76. Two coats of rubber adhesive compound, or another affixation compound, are applied to area C which extends around the perimeter of lower floor 76. Tape hinge 80 is attached to lower floor 76 directly inside of area C, and upper floor 78 is attached to lower floor 76 through reed 80 and tape hinge 80. Bonding portion B receives rubber cement, or another affixation compound, to attach with buoyancy tube 24. Tape 82 is disposed over the seam between upper and lower floors 74 and 76. Finally, flange 82 and patch 84 (FIG. 9) are attached by affixation compound 86 to create a location for a "topping-up" pump to snap into floor flange 82 to inflate floor 28.

Figure 10:
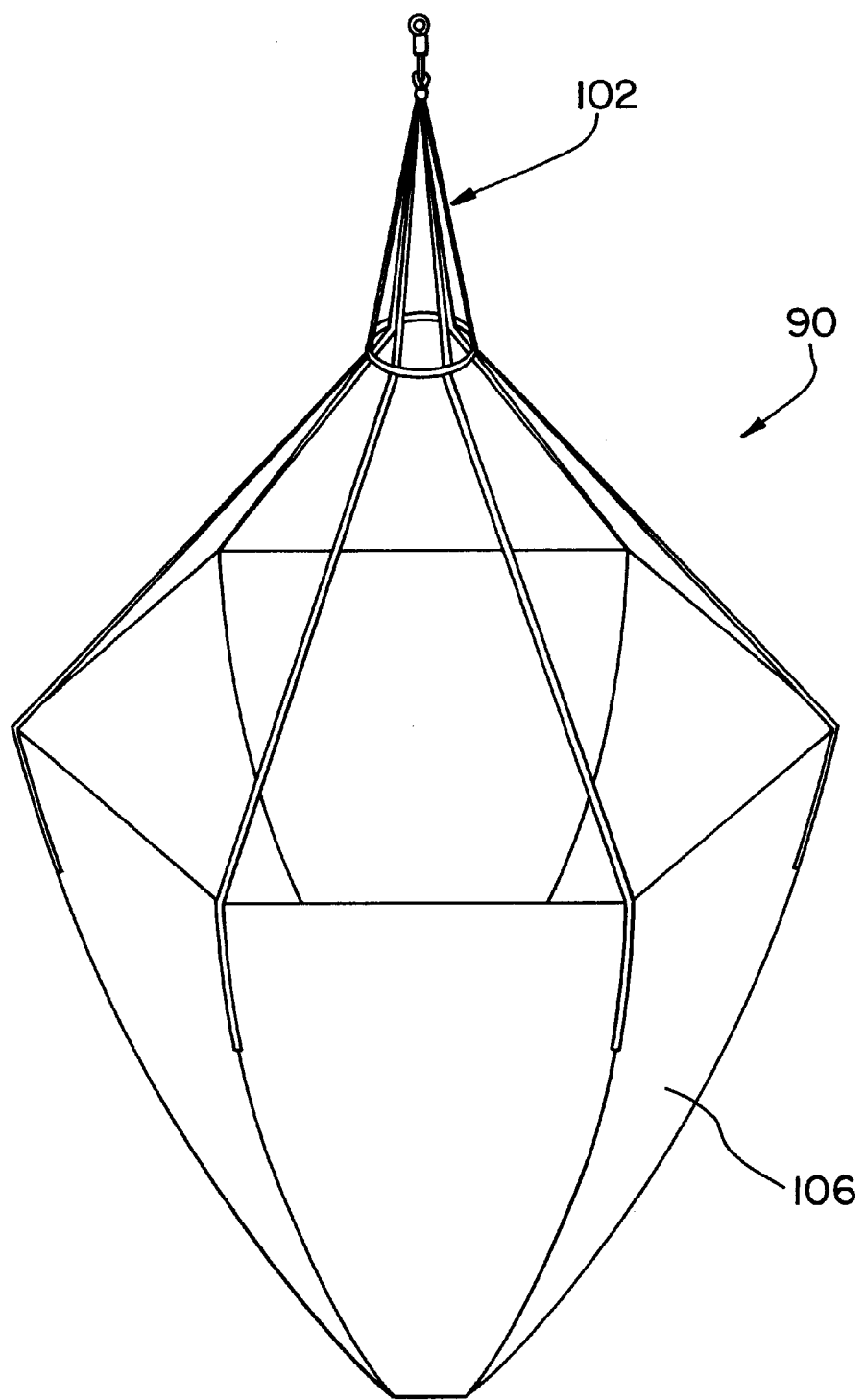
FIG. 10 is a perspective view of the sea anchor of the present invention.

Floor 28 is stabilized in the water by lateral ballast system 88 as shown in FIGS. 1, 3, 4, and 11. Ballast system 88 is augmented by sea anchor 90 as shown in FIGS. 4 and 10. Ballast system 88 comprises a plurality of ballast bags 92 which are disposed beneath floor 28 (FIGS. 1 and 4) and around the outer perimeter of life raft 20 (FIG. 3). As particularly shown in FIG. 11, ballast bag 92 includes ballast chamber 94 for holding water which enters through side holes 96 or vent hole 98. Side holes 96 and vent holes 98 have a size which does not permit the entry of larger fish which may be capable of damaging ballast bag 92. Patches 100 are located at the top of ballast bag 92 for attachment to the bottom of floor 28. When immersed in water, water enters ballast chamber 94 and acts as a weight which resists rocking or rolling motions of the sea. The weight of ballast system 88 allows the first survivor to climb into life raft 20 without risk of capsizing.

Sea anchor 90 also stabilizes life raft 20 when deployed in the water. Tether lines 102 are connected to life raft 20 by swivel 104 to allow drogue 106 to twist and turn in the water without twisting or tangling tether lines 102. In this exemplary embodiment, tether lines 102 are 70 feet long. Drogue 106, in the exemplary embodiment, is constructed from a plurality of generally elliptically shaped fabric panels which are longitudinally sewn together, with each seam incorporating one of the tether lines 102. This construction allows sea anchor 90 to be deployed upon deployment of life raft 20, to immediately aid in stabilizing life raft 20 before the first survivor enters. Further, the weight of water held by drogue 106 helps keep the leading edge of life raft 20 heading into the wind to break oncoming waves and prevent the life raft from spinning or "carouselling".

To deploy life raft 20, inflation system 22 must be activated. Inflation system 22 includes an aluminum inflation cylinder having a Mirada cylinder and firing head to reduce the overall weight of life raft 20. In the exemplary embodiment, a Mirada 3000 Series Firing Head (Part #B-51119) is used, which is available from Mirada Corporation of Chaska, Minn. USA (Mirada is a trademark of Mirada Corporation). With a single inflation cylinder, the possibility of inflation failure is reduced. After the initial inflation, survivors may need to top up buoyancy tubes 24 and 26 and floor 28 due to the coefficient of contraction when ambient temperatures drop severely at night. Each of buoyancy tubes 24 and 26 and floor 26 includes a single action/snap tight valve which may be used by a Mirada Bellows Topping Up Pump (Part #B-51224) (not shown) stored in a compartment within life raft 20. An adapter insert quickly snaps into place for immediate inflation action, unlike conventional threaded adapters which require application of greater manual dexterity by survivors in order to use. In the exemplary embodiment, a Mirada Bellows Topping Up Pump Adapter (Part #A-51300) made from Dupont Delrin material is used, which is available from Mirada Corporation.

Since life raft 20 may initially be deployed upside down, with canopy 30 underwater and ballast system 88 out of the water, the bottom of floor 28 includes righting line handles 108 (FIG. 3). Righting handles 108 include webbing similar to the webbing of boarding handles 66, and in the exemplary embodiment have four such handles disposed in a line across the bottom of floor 28. Righting handles 108 are large to facilitate a survivor grabbing a hold, in this exemplary embodiment handles 108 are loops of approximately two feet. To right an upsidedown life raft 20, a survivor would grab one of righting handles 108 and use minimal body weight as leverage to flip over life raft 20.

Life raft 20 has several other advantageous features. For example, ladders 66 are retractable so that they may be flipped into the interior of life raft 20 and provide an extra support portion for survivors to hold onto during storms and the like. Additional dry storage pockets (not shown) are located in the interior of life raft 20 for storing items brought into, or included as a survival equipment package secured to top inflation tube 26 of life raft 20. The entire raft, including inflation system 22, tubes 24 and 26, floor 28, and canopy 30, may be folded in a uninflated state within a smooth coated aluminized valise (not shown). In the exemplary embodiment, a flexible aluminum fabric is coated and laminated to protect life raft 20 from sharp edges often found under the divan and in luggage storage areas where aviation life rafts are typically stored, not to mention possible jagged edges of damaged aircraft. The outer urethane coating is slick making for easy maneuvering of life raft 20 in and out of its storage area.

Figure 2:
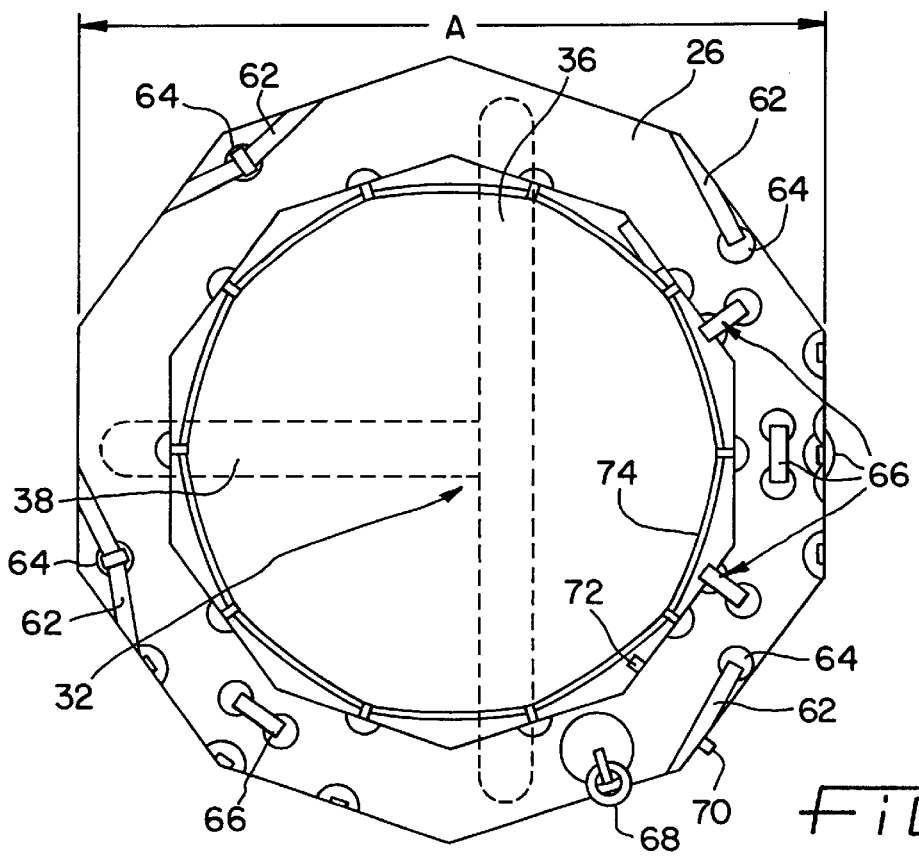
FIG. 2 is a top plan (looking down) view of the life raft of FIG. 1.

Life raft 20 may be configured for different sizes. The following Table 1 sets forth various sizes of life raft 20 which have been designed according to the principles of the present invention (distances are given as inches (cm)). In the following, the distance A refers to the circumference of life raft 20 (FIG. 2). The distance T refers to the combined height of tubes 24 and 26. The distance W refers to the height of the top of canopy 30 in relation to a centerline taken through floor 28. The number of survivors refers to the recommended number of survivors in the life raft of the noted size, although each size is capable of staying afloat with a substantially greater number of survivors.

TABLE 1

| Number of Survivors | A | T | W |
| --- | --- | --- | --- |
| 12–13 | 117 (297.2) | 23 (58.4) | 45 (114.3) |
| 10–11 | 103.5 (297.2) | 21.75 (55.2) | 45 (114.3) |
| 8–9 | 94 (238.8) | 20 (50.8) | 45 (114.3) |
| 6–7 | 67 (221) | 19 (48.3) | 45 (114.3) |
| 4–5 | 76.5 (194.3) | 18 (45.7) | 45 (114.3) |

In the exemplary embodiment, a fabric for tubes 24 and 26, floor 28, and canopy 30 may include 7 ounce, 2-ply biased Neoprene C7Qa and 16AA Neoprene for their lightweight, airtight, and strength qualities. Also, for sealing rubber adhesive, Clifton FA1030 was used.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An inflatable life raft for use in an aircraft, said life raft comprising:

means for providing air;

a floor;

a buoyancy tube disposed about said floor, said buoyancy tube coupled with said air providing means; and canopy means for protecting survivors located on said floor, said canopy means including a cover and an inflatable support having at least three inflatable legs attached to said buoyancy tube, said cover being of double layered construction and extending over said inflatable support, said inflatable support being squared off on its upper portion to provide head room for the survivors, said inflatable support coupled with said air providing means whereby said air providing means is adapted to inflate said buoyancy tube and said inflatable support, said cover comprising four cover sections detachably connected to each other over said inflatable support by zippered portions, and said cover being positionable in at least three arrangements: a closed position wherein all of said cover sections are attached by said zippered portions to enclose said inflatable supports, a sailing position wherein only two of said cover sections extend over said inflatable supports and said two of said cover sections act as a sail, and a convertible position wherein one of said cover sections is not attached by said zippered portions to allow access to an interior region formed by the other three of said cover portions over said inflatable support.

2. The inflatable life raft of claim 1 wherein said canopy cover includes a zippered door allowing for ingress and egress.

3. The inflatable life raft of claim 1 wherein said zippered portions are reversed to deter the penetration of moisture into said interior region.

4. The inflatable life raft of claim 1 wherein said inflatable support includes a tripod arrangement wherein first and second legs form an arch over said floor and a third leg extends to said arch, and said sail formed by said two cover portions extends over said tripod arrangement of said inflatable support.

5. The inflatable life raft of claim 1 wherein said floor has a generally round shape.

6. The inflatable life raft of claim 1 wherein said floor has a polygonal shape with at least ten sides.

7. The inflatable life raft of claim 1 further including a second buoyancy tube disposed on said first buoyancy tube.

8. The inflatable life raft of claim 1 wherein said first buoyancy tube and said second buoyancy tube have approximately the same size.

9. The inflatable life raft of claim 1 wherein the interior of said cover includes a powder blue interior color which eases and soothes the light refraction of the survivors eyes caused by the sun's reflection on the water, and also reduces the sense of anxiety and sea sickness for the survivors.

10. The inflatable life raft of claim 1 further comprising ballast means for stabilizing said life raft in water.

11. The inflatable life raft of claim 1 wherein said canopy cover includes a plurality of radar reflective portions.

12. An inflatable life raft for use in an aircraft, said life raft comprising:

means for providing air;

a floor;

a buoyancy tube disposed about said floor, said buoyancy tube coupled with said air providing means;

canopy means for protecting survivors located on said floor, said canopy means including a cover and an inflatable support, said inflatable support coupled with said air providing means whereby said air providing means is adapted to inflate said buoyancy tube and said inflatable support;

ballast means for stabilizing said life raft when said life raft is inflated and disposed in water, said ballast means including a plurality of rectangular bags disposed around the outer and under perimeter of said floor with the longer side of each of said bags extending generally parallel to a line which is tangential to said buoyancy tube; and a ladder selectively attachable to either an exterior or interior wall of said buoyancy tube, said ladder including three vertically disposed strands of webbing connected by a plurality of cross strands of webbing, said ladder capable of attachment to said exterior wall of said buoyancy tube to facilitate entry of survivors, and said ladder capable of attachment to said interior wall of said buoyancy tube to allow survivors within said life raft to hold onto said ladder for support.

13. The inflatable life raft of claim 12 further comprising a sea anchor coupled to one of said floor, said buoyancy tube, and said ballast means.

14. The inflatable life raft of claim 13 wherein said sea anchor includes a swivel attached to said one of said floor, said buoyancy tube, and said ballast means.

15. The inflatable life raft of claim 12 wherein said canopy cover has at least three arrangements: a closed position, a sailing position, and a convertible position.

16. The inflatable life raft of claim 12 wherein said floor and said buoyancy tube has a polygonal shape with at least ten sides, and said ballast means includes five of said bags disposed in a pentagonal arrangement.

17. The inflatable life raft of claim 12 wherein said ballast means includes a plurality of ballast bags disposed around the perimeter of said floor.

18. The inflatable life raft of claim 12 wherein said floor comprises an upper floor, a lower floor, and a plurality of reeds defining a buoyancy chamber.

19. The inflatable life raft of claim 12 wherein said ladder comprises webbing having a thickness of at least two inches.

20. The inflatable life raft of claim 12 further comprising a boarding grip disposed on said buoyancy tube adjacent an external mounting point for said ladder.

21. The inflatable life raft of claim 20 wherein said boarding grip comprises webbing having a thickness of at least two inches.

22. An inflatable life raft for use in an aircraft, said life raft comprising:

means for providing air;

a floor;

a buoyancy tube disposed about said floor, said buoyancy tube coupled with said air providing means; and canopy means for protecting survivors located on said floor, said canopy means including a cover and an inflatable support having at least three inflatable legs attached to said buoyancy tube, said inflatable support coupled with said air providing means whereby said air providing means is adapted to inflate said buoyancy tube and said inflatable support;

a ladder selectively attachable to either an exterior or interior wall of said buoyancy tube, said ladder including three vertically disposed strands of webbing connected by a plurality of cross strands of webbing, said ladder capable of attachment to said exterior wall of said buoyancy tube to facilitate entry of survivors, and said ladder capable of attachment to said interior wall of said buoyancy tube to allow survivors within said life raft to hold onto said ladder for support.

23. The inflatable life raft of claim 22 wherein said ladder comprises webbing having a thickness of at least two inches.

24. The inflatable life raft of claim 22 further comprising a boarding grip disposed on said buoyancy tube adjacent an external mounting point for said ladder.

25. The inflatable life raft of claim 24 wherein said boarding grip comprises webbing having a thickness of at least two inches.

26. An inflatable life raft for use in an aircraft, said life raft comprising:

means for providing air;

a floor;

a buoyancy tube disposed about said floor, said buoyancy tube coupled with said air providing means;

canopy means for protecting survivors located on said floor, said canopy means including a cover and an inflatable support, said inflatable support coupled with said air providing means whereby said air providing means is adapted to inflate said buoyancy tube and said inflatable support; and a plurality of radar reflective portions disposed on the exterior of said cover, said cover comprising four cover sections detachably connected to each other over said inflatable support by zippered portions, and said cover being positionable in at least three arrangements: a closed position wherein all of said cover sections are attached by said zippered portions to enclose said inflatable supports, a sailing position wherein only two of said cover sections extend over said inflatable supports and said two of said cover sections act as a sail, and a convertible position wherein one of said cover sections is not attached by said zippered portions to allow access to an interior region formed by the other three of said cover portions over said inflatable support.

27. The inflatable life raft of claim 26 wherein said zippered portions are reversed to deter the penetration of moisture into said interior region.

28. The inflatable life raft of claim 26 wherein said inflatable support includes a tripod arrangement wherein first and second legs form an arch over said floor and a third leg extends to said arch, and said sail formed by said two cover portions extends over said tripod arrangement of said inflatable support.

29. An inflatable life raft for use in an aircraft, said life raft comprising:

means for providing air;

a floor;

two buoyancy tubes disposed adjacent each other, the bottom one of said buoyancy tubes disposed about said floor, said buoyancy tubes coupled with said air providing means;

canopy means for protecting survivors located on said floor, said canopy means attached to the top of one of said buoyancy tubes, said canopy means including a cover and an inflatable support, said inflatable support coupled with said air providing means whereby said air providing means is adapted to inflate said buoyancy tubes and said inflatable support, said cover comprising four cover sections detachably connected to each other over said inflatable support by zippered portions, and said cover being positionable in at least three arrangements: a closed position wherein all of said cover sections are attached by said zippered portions to enclose said inflatable supports, a sailing position wherein only two of said cover sections extend over said inflatable supports and said two of said cover sections act as a sail, and a convertible position wherein one of said cover sections is not attached by said zippered portions to allow access to an interior region formed by the other three of said cover portions over said inflatable support; and activation means for activating said air providing means to inflate said buoyancy tube and said inflatable support, said activation means including a single inflation cylinder for inflating both said buoyancy tubes and said canopy means.

30. The inflatable life raft of claim 29 further comprising a righting line with hand grips mounted on the bottom of said floor whereby when said life raft is inflated upside down in water, a person may grasp said righting line with hand grip and right said life raft with ease.

31. The inflatable life raft of claim 29 wherein said zippered portions are reversed to deter the penetration of moisture into said interior region.

32. The inflatable life raft of claim 29 wherein said inflatable support includes a tripod arrangement wherein first and second legs form an arch over said floor and a third leg extends to said arch, and said sail formed by said two cover portions extends over said tripod arrangement of said inflatable support.

* * * * *